US009520961B2

United States Patent
Xia et al.

(10) Patent No.: US 9,520,961 B2
(45) Date of Patent: Dec. 13, 2016

(54) SYSTEM AND METHODS FOR OPTICAL LAMBDA FLOW STEERING

(71) Applicant: Telefonaktiebolaget L M Ericsson (publ), Stockholm (SE)

(72) Inventors: Ming Xia, San Jose, CA (US); Meral Shirazipour, San Jose, CA (US); Ying Zhang, Fremont, CA (US); Howard Green, San Jose, CA (US); Attila Zoltan Takacs, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 324 days.

(21) Appl. No.: 14/192,133

(22) Filed: Feb. 27, 2014

(65) Prior Publication Data

US 2015/0207586 A1 Jul. 23, 2015

Related U.S. Application Data (60) Provisional application No. 61/928,996, filed on Jan. 17, 2014.

(51) Int. Cl.
*H04J 14/00* (2006.01)
*H04J 14/02* (2006.01)
*H04Q 11/00* (2006.01)

(52) U.S. Cl.
CPC ........ *H04J 14/0212* (2013.01); *H04J 14/0269* (2013.01); *H04Q 11/0003* (2013.01); *H04Q 2011/0073* (2013.01)

(58) Field of Classification Search
CPC ................................................. H04J 14/0212
See application file for complete search history.

(56) References Cited

U.S. PATENT DOCUMENTS 8,880,739 B1 * 11/2014 Brar ...................... H04Q 3/0062
370/250
2004/0264500 A1 12/2004 Bansal et al.
(Continued)

OTHER PUBLICATIONS

Chen et al; OSA: An optical switching Architecture for data center networks with Unprecedented Flexibility; Apr. 2012, optical society of America; pp. 1-14.*

(Continued)

*Primary Examiner* — Ken N. Vanderpuye
*Assistant Examiner* — Amritbir Sandhu
(74) *Attorney, Agent, or Firm* — Nicholson, De Vos, Webster & Elliot, LLP (57) ABSTRACT

A system implementing an optical steering domain that steers traffic flows through a plurality of processing nodes is described. The system includes a first, second, and third wavelength selective switch (WSS). The first WSS receives the traffic flows, and transmits traffic flows out a plurality of tributary ports toward the processing nodes. The second WSS receives the processed traffic from the processing nodes, and sends it to a third WSS. The third WSS receives the processed traffic from the second WSS, and causes the processed traffic requiring further processing to be transmitted out its third plurality of tributary ports to be looped back toward the plurality of processing nodes, and causes the processed traffic that does not require further processing to be transmitted by a different tributary port of the third WSS that is an exit port leading out of the optical steering domain.

20 Claims, 7 Drawing Sheets

(56) References Cited

U.S. PATENT DOCUMENTS

| | | | |
|---|---|---|---|
| 2010/0260500 A1* | 10/2010 | Ji | H04J 14/0212 398/50 |
| 2011/0131431 A1 | 6/2011 | Akers et al. | |
| 2012/0099863 A1* | 4/2012 | Xu | H04Q 11/0005 398/49 |
| 2013/0014101 A1 | 1/2013 | Ballani et al. | |
| 2013/0195462 A1* | 8/2013 | Ghioni | H04J 14/0219 398/83 |
| 2013/0272305 A1* | 10/2013 | Lefebvre | H04L 47/24 370/392 |
| 2013/0287397 A1* | 10/2013 | Frankel | H04B 10/271 398/50 |
| 2013/0294236 A1* | 11/2013 | Beheshti-Zavareh | H04L 47/22 370/235 |
| 2014/0064283 A1* | 3/2014 | Balus | H04L 49/70 370/392 |
| 2014/0099119 A1 | 4/2014 | Wei et al. | |
| 2014/0119728 A1* | 5/2014 | Zhang | H04J 14/0204 398/48 |
| 2014/0181292 A1* | 6/2014 | Venkataswami | H04L 45/04 709/224 |
| 2014/0196037 A1* | 7/2014 | Gopalan | G06F 9/4856 718/1 |
| 2014/0201375 A1 | 7/2014 | Beereddy et al. | |
| 2014/0233385 A1* | 8/2014 | Beliveau | H04L 47/122 370/235 |
| 2014/0255026 A1* | 9/2014 | Roorda | H04J 14/0212 398/49 |
| 2014/0341568 A1* | 11/2014 | Zhang | H04J 14/0212 398/34 |
| 2014/0363160 A1* | 12/2014 | Gumaste | H04J 14/0212 398/48 |
| 2015/0098700 A1* | 4/2015 | Zhu | H04Q 11/0005 398/48 |
| 2015/0104170 A1* | 4/2015 | Xia | H04J 14/0202 398/48 |
| 2015/0113144 A1 | 4/2015 | Bauer et al. | |
| 2015/0139654 A1* | 5/2015 | Mandelbaum | H04B 10/2507 398/83 |
| 2015/0147060 A1* | 5/2015 | Patel | H04Q 11/0005 398/48 |
| 2015/0181317 A1* | 6/2015 | Yin | H04Q 11/0062 398/45 |
| 2015/0207586 A1* | 7/2015 | Xia | H04J 14/0269 398/48 |
| 2015/0295849 A1* | 10/2015 | Xia | H04L 47/782 370/235 |
| 2015/0365462 A1 | 12/2015 | Jenkins et al. | |
| 2016/0087846 A1* | 3/2016 | Prasad | H04L 41/0806 398/45 |
| 2016/0105252 A1* | 4/2016 | Bouda | H04J 14/0224 398/49 |
| 2016/0149663 A1* | 5/2016 | Ji | H04J 14/0212 398/48 |

OTHER PUBLICATIONS

"Network Functions Virtualisation (NFV)—Network Operator Perspectives on Industry Progress", White Paper [Online]: http://portal.etsi.org/NFV/NFV_White_Paper2.pdf, Oct. 2013, 16 pages.
"Network Functions Virtualisation (NFV) Architectural Framework", ETSI GS NFV 002 V1.1.1, Oct. 2013, [Online] available: http://www.etsi.org/deliver/etsi_gs/NFV/001_099/002/01.01.01_60/gs_NFV002v010101p.pdf, 21 pages.
"Network Functions Virtualization, An Introduction, Benefits, Enablers, Challenges & Call for Action", White Paper [Online] http://portal.etsi.org/NFV/NFV_White_Paper.pdf, Oct. 2012, 16 pages.
"OpenFlow Specification", OpenFlow Switch Specification 1.4.0, Oct. 15, 2013, 205 pages.
"Wavelength Selective Switches for ROADM Applications", http://www.finisar.com/sites/default/files/pdf/WSS%20ROADM%20Product%20Guide%209_2011%20V7_1.pdf, 2011, 4 pages.
"WDM: ITUT G694.1 http://www.itu.int/rec/T-REC-G.694.1", Feb. 2012, 16 pages.
Beliveau, Ludovic, et al., "Methods and Network Nodes for Traffic Steering Based on Per-Flow Policies", U.S. Appl. No. 13/768,956, Feb. 15, 2013, 32 pages.
Bitar, N., et al., "Technologies and protocols for data center and cloud networking", IEEE Communications Magazine, vol. 51, No. 9, pp. 24-31, Sep. 2013.
Chen, K., et al., "OSA: An optical switching architecture for data center networks with unprecedented flexibility", proc. USENIX/NSDI, San Jose, CA, Apr. 2012, 14 pages.
Farrington, N., et al., "Helios: a hybrid electrical/optical switch architecture for modular data centers", proc. ACM SIGCOMM 2010, pp. 339-350.
Gringeri, S., et al., "Flexible architectures for optical transport nodes and networks", IEEE Communications Magazine, vol. 48, No. 7, pp. 40-50, Jul. 2010.
Joseph, D., et al., "A policy-aware switching layer for data centers", proc. ACM SIGCOMM, pp. 51-62, 2008.
Mannie, E., "Generalized Multi-Protocol Label Switching (GMPLS) architecture", RFC 3945, Oct. 2004, IETF, Oct. 2004, 69 pages.
Qazi, Z., et al., "Simple-fying Middlebox Policy Enforcement Using SDN", Proc. ACM SIGCOMM, Hong Kong, Aug. 2013, 12 pages.
Sekar, V., et al., "Design and implementation of a consolidated middlebox architecture", proc. Symposium on Networked Systems Design and Implementation, 2012, 14 pages.
Sekar, V., et al., "The middlebox manifesto: enabling innovation in middlebox deployment", proc. 10th ACM Workshop on Hot Topics in Networks, 2011, 6 pages.
Sherry, J., et al., "Making middleboxes someone else's problem: network processing as a cloud service", proc. ACM SIGCOMM, pp. 13-24, 2012.
Wang, G., et al., "c-Through: Part-time Optics in Data Centers", proc. ACM SIGCOMM 2010, pp. 327-338.
Xia, M., et al., "Green provisioning for optical WDM networks", IEEE Journal of Selected Topics in Quantum Electronics (JSTQE), vol. 17, No. 2, pp. 437-445, Mar.-Apr., 2011.
Yao, C., "What is wavelength selective switch-WSS?", Mar. 14, 2011, [Online] available: http://www.fiberoptics4sale.com/wordpress/what-is-wavelength-selective-switchwss/, 8 pages.
Zhang, Ying, et al., "StEERING: A Software-Defined Networking for Inline Service Chaining", ICNP 2013, Goettingen, Germany, Oct., 2013, 10 pages.
"Proceedings of NSDI '12: 9th USENIX Symposium on Networked Systems Design and Implementation," Apr. 25-27, 2012, pp. 1-437, San Jose, CA, USENIX Association.
Jordi Perelló et al., "All-Optical Packet/Circuit Switching-Based Data Center Network for Enhanced Scalability, Latency, and Throughput," Nov./Dec. 2013, pp. 14-22, IEEE Network.
L. Schares et al., "A reconfigureable interconnect fabric with optical circuit switch and software optimizer for stream computing systems," 2009, pp. 1-3, Optical Society of America, IEEE.
"Transmission Control Protocol, Darpa Internet Program Protocol Specification," Sep. 1981, 91 pages, RFC: 793, Information Sciences Institute, University of Southern California, Marina del Rey, California.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
B. Davie, et al., "An Expedited Forwarding PHB (Per-Hop Behavior)," Mar. 2002, 16 pages, Network Working Group, Request for Comments: 3246, The Internet Society.
B. Fenner, et al., "Management Information Base for the User Datagram Protocol (UDP)," Jun. 2005, 19 pages, Network Working Group, Request for Comments: 4113, The Internet Society.
C. Hedrick, "Routing Information Protocol," Jun. 1988, 33 pages, Network Working Group, Request for Comments: 1058.

(56) References Cited

OTHER PUBLICATIONS

D. Awduche, et al., "RSVP-TE: Extensions to RSVP for LSP Tunnels," Dec. 2001, 61 pages, Network Working Group, Request for Comments: 3209, The Internet Society.

D. Black, "Differentiated Services and Tunnels," Oct. 2000, 14 pages, Network Working Group, Request for Comments: 2983, The Internet Society.

D. Black, et al., "Per Flop Behavior Identification Codes," Jun. 2001, 8 pages, Network Working Group, Request for Comments: 3140, The Internet Society.

D. Borman, et al., "IPv6 Jumbograms," Aug. 1999, 9 pages, Network Working Group, Request for Comments: 2675, The Internet Society.

D. Grossman, "New Terminology and Clarifications for Diffserv," Apr. 2002, 10 pages, Network Working Group, Request for Comments: 3260, The Internet Society.

David Oran, "OSI IS-IS Intra-domain Routing Protocol," Feb. 1990, 157 pages, Network Working Group, Request for Comments: 1142.

E. Rosen, et al., "BGP/MPLS IP Virtual Private Networks (VPNs)," Feb. 2006, 47 pages, Network Working Group, Request for Comments: 4364, The Internet Society.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

F. Baker, et al., "Management Information Base for the Differentiated Services Architecture," May 2002, 116 pages, Network Working Group, Request for Comments: 3289, The Internet Society.

G. Malkin, "RIP Version 2," Nov. 1998, 39 pages, Network Working Group, Request for Comments: 2453, The Internet Society.

G. Malkin, et al., "RIPng for IPv6," Jan. 1997, 19 pages, Network Working Group, Request for Comments: 2080.

J. Babiarz, et al., "Configuration Guidelines for DiffServ Service Classes," Aug. 2006, 57 pages, Network Working Group, Request for Comments: 4594, The Internet Society.

J. Heinanen, et al., "Assured Forwarding PHB Group," Jun. 1999, 11 pages, Network Working Group, Request for comments: 2597, The Internet Society.

J. Moy, "OSPF Version 2," Apr. 1998, 244 pages, Network Working Group, Request for Comments: 2328, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

J. Postel, "User Datagram Protocol," 28 Aug. 1980, 3 pages, RFC: 768.

J. Wroclawski, "Specification of the Controlled-Load Network Element Service," Sep. 1997, 19 paaes, Network Working Group, Request for Comments: 221t.

J. Wroclawski, "The Use of RSVP with IETF Integrated Services," Sep. 1997, 33 pages, Network Working Group, Request for Comments: 2210.

K. Chan, et al. "Differentiated Services Quality of Service Policy Information Base," Mar. 2003, 96 pages, Network Norking Group, Request for Comments: 3317, The Internet Society.

K. Kompella, et al., "Procedures for Modifying the Resource reSerVation Protocol (RSVP)," Oct. 2004, 7 pages, Network Working Group, Request for Comments: 3936, The Internet Society.

K. Kompella, et al., "Virtual Private Lan Service (VPLS) Using Bgp for Auto-Discovery and Signaling," Jan. 2007, 28 pages, Network Working Group, Request for Comments: 4761, The IETF Trust.

K. Nichols, et al., "Definition of Differentiated Services Per Domain Behaviors and Rules for their Specification," Apr. 2001, 24 pages, Network Working Group, Request for Comments: 3086, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

L. Andersson, et al., "LDP Specification," Oct. 2007, 135 pages, Network Working Group, Request for Comments: 5036, The IETF Trust.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

L. Eggert, et al., "Unicast UDP Usage Guidelines for Application Designers," Nov. 2008, 27 pages, Network Norking Group, Request for Comments: 5405, IETF Trust and the persons identified as the document authors.

M. Lasserre, et al., "Virtual Private Lan Service (VPLS) Using Label Distribution Protocol (LDP) Signaling," Jan. 2007, 31 pages, Network Working Group, Request for Comments: 4762, The IETF Trust.

Marcus Scholler et al., "Resilient deployment of virtual network functions", 2013 5th International Congress on Ultra Modern Telecommunications and Control Systems and Workshops, Sep. 1, 2013, pp. 208-214.

R. Braden, et al., "Resource ReSerVation Protocol (RSVP)—Version 1 Functional Specification," Sep. 1997, 112 pages, Network Working Group, Request for Comments: 2205.

R. Coltun, et al., "OSPF for IPv6," Jul. 2008, 94 pages, Network Working Group, Request for Comments: 5340, The IETF Trust.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

S. Blake, et al., "An Architecture for Differentiated Services," Dec. 1998, 36 pages, Network Working Group, Request for Comments: 2475, The Internet Society.

S. Deering, et al., "Internet Protocol, Version 6 (IPv6) Specification," Dec. 1998, 39 pages, Network Working Group, Request for Comments: 2460, The Internet Society.

S. Kent, et al., "Security Architecture for the Internet Protocol," Dec. 2005, 101 pages, Network Working Group, Request for Comments: 4301, The Internet Society.

S. Shenker, et al., "Specification of Guaranteed Quality of Service," Sep. 1997, 20 pages, Network Working Group, Request for Comments: 2212.

T. Socolofsky, et al., "A TCP/IP Tutorial," Jan. 1991, 28 pages, Network Working Group, Request for comments: 1180.

Xia, Ming, et al., "SDN and Optical Flow Steering for Network Function Virtualization", Mar. 2014, 2 pages.

Y. Bernet, et al., "An Informal Management Model for Diffserv Routers," May 2002, 56 pages, Network Working Group, Request for Comments: 3290, The Internet Society.

Y. Rekhter, et al., "A Border Gateway Protocol 4 (BGP-4)," Jan. 2006, 104 pages, Network Working Group, Request for Comments: 4271, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

\* cited by examiner

SYSTEM AND METHODS FOR OPTICAL LAMBDA FLOW STEERING

CROSS-REFERENCE TO RELATED APPLICATIONS

This application claims priority to U.S. Provisional Patent Application No. 61/928,996, entitled "System and Methods for Optical Lambda Flow Steering,", filed Jan. 17, 2014, which is incorporated by reference herein in its entirety.

FIELD

Embodiments of the invention relate to the field of computer networking; and more specifically, to circuit-based lambda flow traffic steering for Network Function Virtualization in the optical domain.

BACKGROUND

The Internet transformation being witnessed today is led by growing connectivity needs, mobile services, cloud computing, and big data. These have significantly increased the volume and requirements of traffic processed by network equipment. To meet these increasing demands while maintaining or improving profitability, network operators are constantly seeking ways to reduce costs and enable faster innovation. To this end, network function virtualization (NFV) is a new paradigm embraced by service providers. In NFV, common network functions are realized in software by using commercial-off-the-shelf (COTS) hardware (e.g., general purpose server and storage hardware, or other "generic" hardware) to provide Network Functions (NFs) through software virtualization techniques. These network functions are referred as Virtualized Network Functions (vNFs). The use of vNFs aids both scalability and largely decouples functionality from physical location, which allows the vNFs to be flexibly placed at the different places (e.g., as at customers' premises, at network exchange points, in central offices, data centers), and further enables time of day reuse, easy support for testing production and developmental versions of software, the enhancement of resilience through virtualization, eased resource sharing, reduced power usage, and the ability to implement various vNFs in networks including heterogeneous server hardware.

Similar to virtual machines, the concept of vNFs allows multiple instances of network functions to be run on shared physical infrastructure, desirably in a data center environment. NFV encompasses both middlebox functionalities (e.g., firewall, deep packet inspection (DPI), network address translation (NAT)) as well as core network functions that are more challenging to virtualize (e.g., session border controllers (SBCs), provider edge (PE) routers, broadband remote access server (BRAS), serving/gateway GPRS support node (SGSN/GGSN)). The core network functions handle large-volume, coarse-granularity traffic flows and don't have the same fine grained traffic steering requirements as middleboxes do. As these core vNFs are instantiated, traffic will need to be routed across various intermediate vNFs before reaching its destination (e.g., in a content delivery server or back to the PE and/or customer edge (CE) router). This process is called traffic steering for NFVs, which requires a flexible network configuration to steer traffic through a set of vNFs.

Compared to the traffic steered across traditional middleboxes, the traffic between core vNFs is usually more aggregated, occurs at much higher rates (e.g., 10 s of Gigabits per second (Gbps)) with a fast-growing trend, and usually doesn't have the same fine-grained traffic steering requirements that normal middleboxes do. Thus, existing Layer2/Layer3 packet-based traffic steering has scalability issues in trying to handle the large traffic volume required when steering traffic between core vNFs, and further may require a large energy use.

Figure 1:
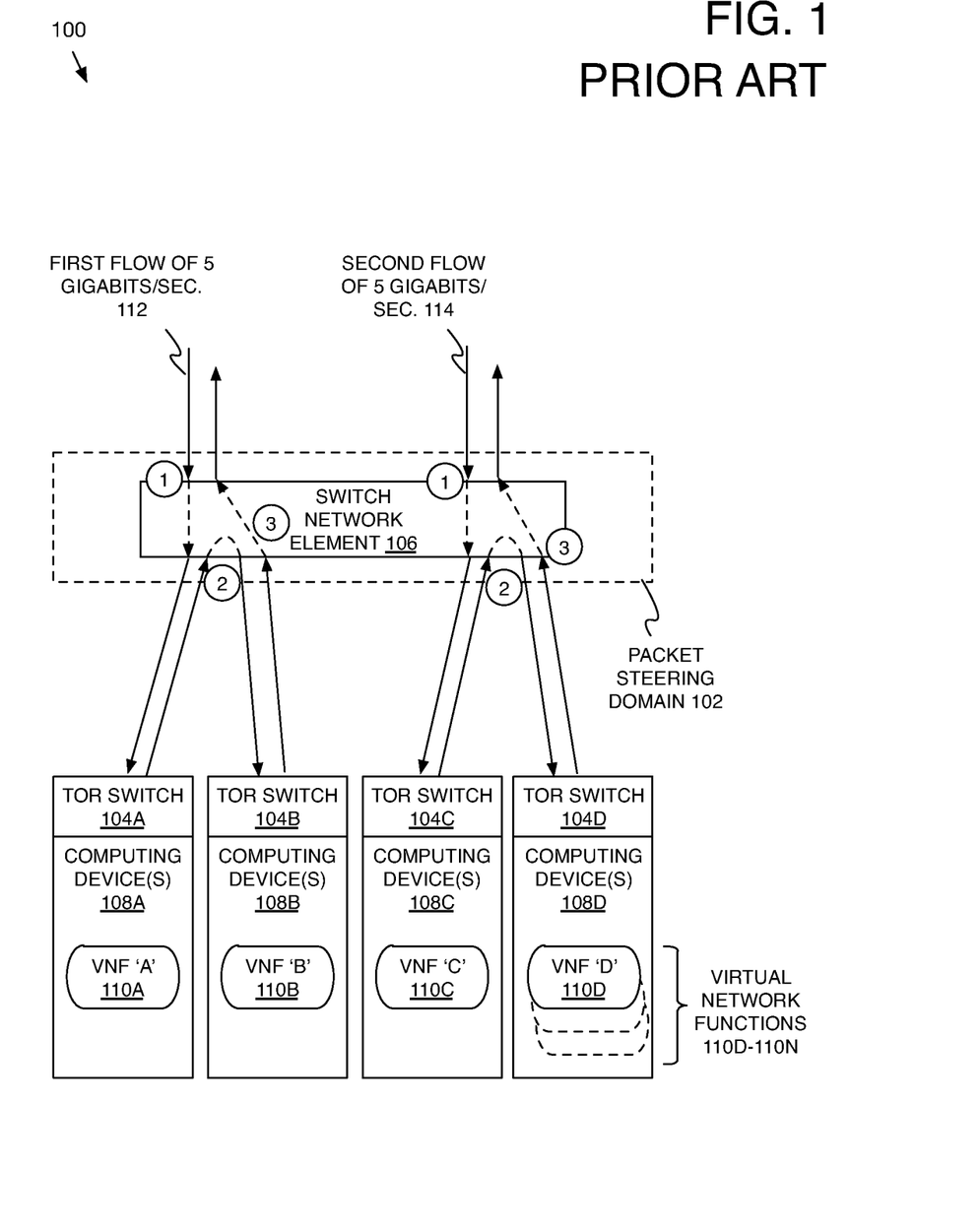
FIG. 1 illustrates a prior art packet-based switching configuration for steering packets through vNFs.

For example, FIG. 1 illustrates a prior art packet-based switching configuration for steering packets through vNFs. This illustration demonstrates the scalability issue for a pure packet-based approach for traffic steering between core vNFs, where data center network infrastructure has to grow with traffic volume and vNF demands. In FIG. 1, a core switch network element 106 in a packet steering domain 102 is tasked with steering two traffic flows (112, 114) through several vNFs 110A-110D.

The first traffic flow 112 enters the packet steering domain 102 at a rate of 5 Gbps, and must be passed to vNF 'A' 110A executing on a computing device of a set of one or more computing devices 108A in a rack and joined through a Top-of-Rack (ToR) switch 104A, and then must be passed to vNF 'B' 110B, which also executes on a computing device of a set of computing devices 108B in another rack and joined through another ToR switch 104B. Similarly, the second traffic flow 114 enters the packet steering domain 102 at a rate of 5 Gbps, and must be passed to vNF 'C' 110C executing on a computing device of a set of computing devices 108C in a rack and joined through a ToR switch 104C, and then must be passed to vNF 'D' 110D, which also executes on a computing device of a set of computing devices 108D in another rack and joined through another ToR switch 104D.

Accordingly, the path for the first traffic flow 112 is to enter the packet steering domain 102 and arrive at the switch network element 106 (at circle '1'), go to the ToR switch 104A, go to the vNF 'A' 110A, go back to ToR switch 104A and then re-enter the switch network element 106 (at circle '2'). Next, this traffic is sent to ToR switch 104B, directed to the vNF 'B' 110B, is returned back to the ToR switch 104B, and returned to the switch network element 106 (at circle '3'), before exiting the packet steering domain 102. The path for the second traffic flow 114 is similar, as it enters the packet steering domain 102 and arrives at the switch network element 106 (at circle '1'), is sent to the ToR switch 104B on its way to the vNF 'C' 110C, and thus returns to ToR switch 104B and then re-enters the switch network element 106 (at circle '2'). Next, this traffic of the second traffic flow 114 is sent to ToR switch 104D, directed to the vNF 'D' 110D, is returned back to the ToR switch 104D, and then returned back to the switch network element 106 (at circle '3'), before exiting the packet steering domain 102.

In this example, each of these two 5 Gbps flows (112, 114) transits the switch network element 106 three times, which means that the switch network element 106 must process a packet throughput of 30 Gbps (=5 Gbps per flow*3 occurrences per flow*2 flows). This presents an amplification effect, as the addition of new flows will create an amplified load being placed on the packet steering domain 102.

Further, as the size (i.e., rate) of each flow grows and the number of vNFs each flow must transit grows (a natural occurrence over time as traffic increases and the number of to-be-applied NFs increases), this amplification effect is further magnified. For example, assume the packet steering domain 102 still processes two flows, but that each flow is instead 10 Gbps and each flow must transit three vNFs, each instantiated on server hardware at a different racks. In this case, each flow transits the packet steering domain 102 four times, and now the packet throughput at the packet steering domain 102 is 80 Gbps. For core switches used in data centers, high throughput typically requires more hardware density and power consumption, and thus, there is a strong need for efficient and scalable systems to direct high-volume traffic flows across vNFs that may dynamically change in terms of location and the required sequences of vNF traversal.

SUMMARY

According to an embodiment, a method in an optical steering domain for steering one or more traffic flows through a plurality of processing nodes is described. Each of the one or more flows of traffic is to be processed by a different defined series of one or more processing nodes of the plurality of processing nodes. In an embodiment, each of the plurality of processing nodes are vNFs. The optical steering domain includes a set of three or more wavelength selective switches (WSSs). The method includes receiving traffic of a traffic flow of the one or more traffic flows at a common port of a first WSS of the set of WSSs. The first WSS includes a plurality of tributary ports coupled to a respective plurality of optical links leading toward the plurality of processing nodes. The method also includes transmitting, using a first tributary port of the WSS over a first optical link of the plurality of optical links, the traffic toward a first processing node of the plurality of processing nodes. The method also includes receiving, at a tributary port of a second WSS of the set of WSSs, processed traffic. The processed traffic is the result of the traffic being processed by the first processing node. The method further includes transmitting, at a common port of the second WSS, the processed traffic to a third WSS of the set of WSSs, and receiving, at a common port of the third WSS, the processed traffic. The method also includes transmitting, one or more times, the processed traffic out of one or more tributary ports of the third WSS on one or more optical links coupled to the one or more tributary ports of the third WSS on one end and coupled to one or more of the plurality of optical links that are coupled to the first WSS, to be looped back for further processing by one or more other processing nodes of the plurality of processing nodes.

According to an embodiment, a system to implement an optical steering domain to steer one or more traffic flows through a plurality of processing nodes is described. The system includes a first wavelength selective switch (WSS), a second WSS, and a third WSS coupled to the second WSS. The first WSS includes a first common port configured to receive the one or more traffic flows from outside the optical steering domain, a first plurality of tributary ports to be coupled to a respective first plurality of optical links leading toward the plurality of processing nodes, and a first steering module coupled to the first common port and the first plurality of tributary ports. The first steering module is configured to identify, for each of the one or more traffic flows, a wavelength that the traffic flow is to be sent at and one of the first plurality of tributary ports to be used to send the traffic flow toward the processing node that the traffic flow is to be initially processed by. The first steering module is also configured to cause each of the one or more traffic flows to be sent at the respective identified wavelength using the respective one of the first plurality of tributary ports. The second WSS includes a second plurality of tributary ports configured to receive processed traffic for each of the one or more traffic flows. The processed traffic is the traffic of the one or more flows that has been processed by one or more of the plurality of processing nodes. The second WSS further includes a second common port coupled to the third WSS and that is configured to transmit the received processed traffic to the third WSS. The third WSS, which is coupled to the second WSS, includes a third common port configured to receive the processed traffic from the second WSS, a third plurality of tributary ports coupled to a second plurality of optical links that are coupled to the first plurality of optical links, and a second steering module coupled to the third common port and to the third plurality of tributary ports. The second steering module is configured to cause that of the processed traffic that requires further processing to be transmitted by the third plurality of tributary ports to be looped back toward the plurality of processing nodes. The second steering module is further configured to cause that of the processed traffic that does not require further processing to be transmitted by a different tributary port of the third WSS that is an exit port leading out of the optical steering domain.

In an embodiment, a method in an optical steering domain for steering traffic through a plurality of processing nodes is described. The method includes receiving a first set of one or more packets at a first optical port of a first wavelength selective switch (WSS). The first set of packets are to be serially processed by a first processing node and a second processing node of the plurality of processing nodes. The method further includes transmitting, at a second optical port of the first WSS, the first set of packets toward the first processing node. The method further includes receiving, at a first optical port of a second WSS, a second set of packets that have been processed and sent by the first processing node, and transmitting, at a second optical port of the second WSS, the second set of packets to a third WSS. The method further includes receiving, at a first optical port of the third WSS, the second set of packets, and transmitting, at a second optical port of the third WSS, the second set of packets. The second optical port is coupled to an optical link that is further coupled to another optical link that itself is coupled to the first WSS at one end and leads to the second processing node at the other end. The method further includes receiving a third set of packets at a third optical port of the second WSS. The third set of packets result from the processing of the second set of packets by the second processing node. The method further includes transmitting, at the second optical port of the second WSS, the third set of packets to the third WSS, and receiving, at the third WSS, the third set of packets. The method further includes transmitting, at a third optical port of the third WSS, the third set of packets out of the optical steering domain.

Embodiments of the invention are thus enabled to steer coarse traffic flows carried in wavelengths across processing nodes (e.g., core vNFs) with high efficiency by employing reconfigurable wavelength switching devices and a fiber-loopback scheme to dynamically control the path of wavelength. By switching traffic in an optical domain, a significant reduction of power results, and the system provides good scalability and flexibility as traffic volume and vNF demand grow or change. Further, embodiments are applicable to many scenarios where bulky traffic is to be steered across multiple sites.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. However, depending upon the context of the use of these terms (especially with regard to fiber optics), the term "coupled" may simply refer to two fiber links being physically joined, perhaps using a coupler device. The exact meaning of the terms, however, will be apparent to those of skill in the art based upon the context of their use.

An electronic device or computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s)

(IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics.

As used herein, a processing node is an entity in a network that is capable of receiving packets and performing one or more functions with those packets. A processing node may optionally also further transmit those packets, and these transmitted packets may be the same as when they arrived at the processing node or different (i.e., modified by the processing node). For example, a processing node can be any node of a data center, including but not limited to a data/file storage server, a router, a firewall (e.g., a stateful firewall), a load-balancer, a DPI service element, database, web server, email server, virus/spam/phishing detection elements, an application delivery controller, a special-purpose server, a softswitch, etc. A processing node may include software and the hardware (e.g., a computing device) that it executes upon. In some instances, a processing node is a vNF.

Unlike traditional network architectures that require complex network management functions to be distributed in the control planes of multifunctional network elements throughout the network, and further require complex data and control planes integrated into the same multifunctional network element, a software-defined network (SDN) allows the data plane of the network to be separated from the control plane. Data planes can be implemented as simple discrete flow switches (forwarding elements) distributed throughout the network, and the control planes providing the networks intelligence are implemented in a centralized controller that oversees the flow switches. By decoupling the control function from the data forwarding function, software-defined networking eases the task of modifying the network control logic and provides a programmatic interface upon which developers can build a wide variety of new routing and protocol management applications. This allows the data and control planes to evolve and scale independently, while reducing the management necessary for the data plane network components.

In one embodiment of a software-defined network, the control plane controls the forwarding planes through a control plane signaling protocol over a secure and reliable transport connection between the forwarding elements and the controller. The controller typically includes an operating system that provides basic processing, I/O, and networking capabilities. A middleware layer provides the context of the software-defined network controller to the operating system and communicates with various forwarding plane elements using a control plane signaling protocol. An application layer over the middleware layer provides the intelligence required for various network operations such as protocols, network situational awareness, and user-interfaces. At a more abstract level, the application layer works with a logical view of the network and the middleware layer provides the conversion from the logical view to the physical view.

In an embodiment of a software-defined network paradigm, each forwarding element is a flow switching enabled network device. The flow switching enabled network device forwards packets based on the flow each packet belongs to instead of the destination IP address within the packet, which is typically used in current conventional packet switched IP networks. A flow may be defined as a set of packets whose headers match a given pattern of bits. In this sense, traditional IP forwarding is also flow-based forwarding where the flow is defined by the destination IP address only. Instead of just considering the destination IP address or the source IP address, though, generic flow definitions allow many fields (e.g., approximately 40, or more) in the packet headers to be considered.

The control plane transmits relevant messages to a forwarding element based on application layer calculations and middleware layer mapping for each flow. The forwarding element processes these messages and programs the appropriate flow information and the corresponding actions in its flow tables. The forwarding element maps packets to flows and forwards packets based on these flow tables.

One problem addressed by embodiments of the invention can be illustrated by considering the need for traffic forwarding inside a data center across various racks and servers. Network traffic usually enters the access network, traverses common core network functions such as routers/switches, access gateways, and middleboxes, and ultimately reaches end devices (e.g., server hardware in a data center). The traffic flows may fluctuate depending on the applications being supported, and the overall resource management practices in place. In NFV scenarios, traffic patterns are expected to fluctuate more than in today's data centers where most flows are from a user machine to a terminating server. As a consequence, vNFs will be instantiated and turned off at various servers as needed, and large data flows are to be steered across the vNFs based on network status and server availability. Therefore, the network infrastructure connecting various vNFs will need to be dynamically configured.

Today's pure packet-based traffic steering approaches include Ethernet based overlay routing and software-defined networking (SDN) based flow steering like OpenFlow. Typically, these approaches define rules at the packet level for different vNF paths. While a packet-based scheme may be required for fine grained traffic steering such as service chaining, this same solution is not efficient—especially in terms of power usage—for the set of high-rate aggregated traffic flows that need to traverse a number of core vNFs. Embodiments of the invention assure high transmission and switching efficiency, such that the amount of packet processing in terms of packet throughput can be significantly reduced by employing traffic switching in an optical domain.

A method, apparatus, and system for steering one or more traffic flows through a plurality of processing nodes in an optical steering domain is described. In an embodiment of the invention, each of the one or more flows of traffic is to be processed by a different defined series of one or more processing nodes of the plurality of processing nodes. In an embodiment, the optical steering domain comprises a set of three or more wavelength selective switches (WSSs), which are configured to transmit the one or more traffic flows toward the plurality of processing nodes, receive the processed traffic of the traffic flows, and loopback any of the processed traffic that requires further processing toward the necessary processing nodes. In some embodiments, each processing node is a vNF, and in some of those embodiments each vNF is a core vNF. The one or more traffic flows received at the optical steering domain, in an embodiment, are received from a ROADM, which in some embodiments receives traffic and sends it to either the optical steering domain or a packet switching domain.

In an embodiment, per user traffic flows arrive and are inspected by an operator's aggregation domain. Based on policy/rules injected through OSS/BSS, the flows are classified in aggregated groups that will determine which NF sequence the flow will go through. Flows belonging to the same aggregated group may be marked (either with a common virtual local area network (VLAN) identifier (ID), Multiprotocol Label Switching (MPLS) Label, or similar). The SDN controller and the cloud management jointly perform routing and wavelength assignment (RWA) and VM assignment for each aggregated group. The aggregation routers are equipped with tunable optics (also referred to herein as "tunable transceivers") to convert each aggregated group to a specific wavelength as outputted from RWA. A ROADM configured by the SDN controller identifies the aggregated groups, and dispatches the groups to either a packet steering domain or an optical steering domain. Those of the aggregated flows heading to the packet steering domain are dropped by the ROADM to a core switch for regular steering in the packet steering domain. However, those of the aggregated groups heading to optical steering domain (or, "lambda flows") are routed into the optical steering domain to WSS devices, and then are steered based on their central frequencies each time entering the WSS. The WSS devices and the tunable transceivers are configured by the SDN controller based on the RWA. The lambda flows are steered by the WSS devices and loopback fibers to be sent through the desired series of vNFs, and then the lambda flows will be routed back to the ROADM after such processing.

Thus, embodiments of the invention are thus enabled to steer coarse wavelength traffic across core vNFs with high efficiency by employing reconfigurable WSSs and a fiber-loopback scheme to dynamically control the path of wavelength. By switching traffic in an optical domain, a significant reduction of power results, and the system provides good scalability and flexibility as traffic volume and vNF demand grow or change. Further, embodiments are applicable to many scenarios where bulky traffic is to be steered across multiple sites.

Figure 2:
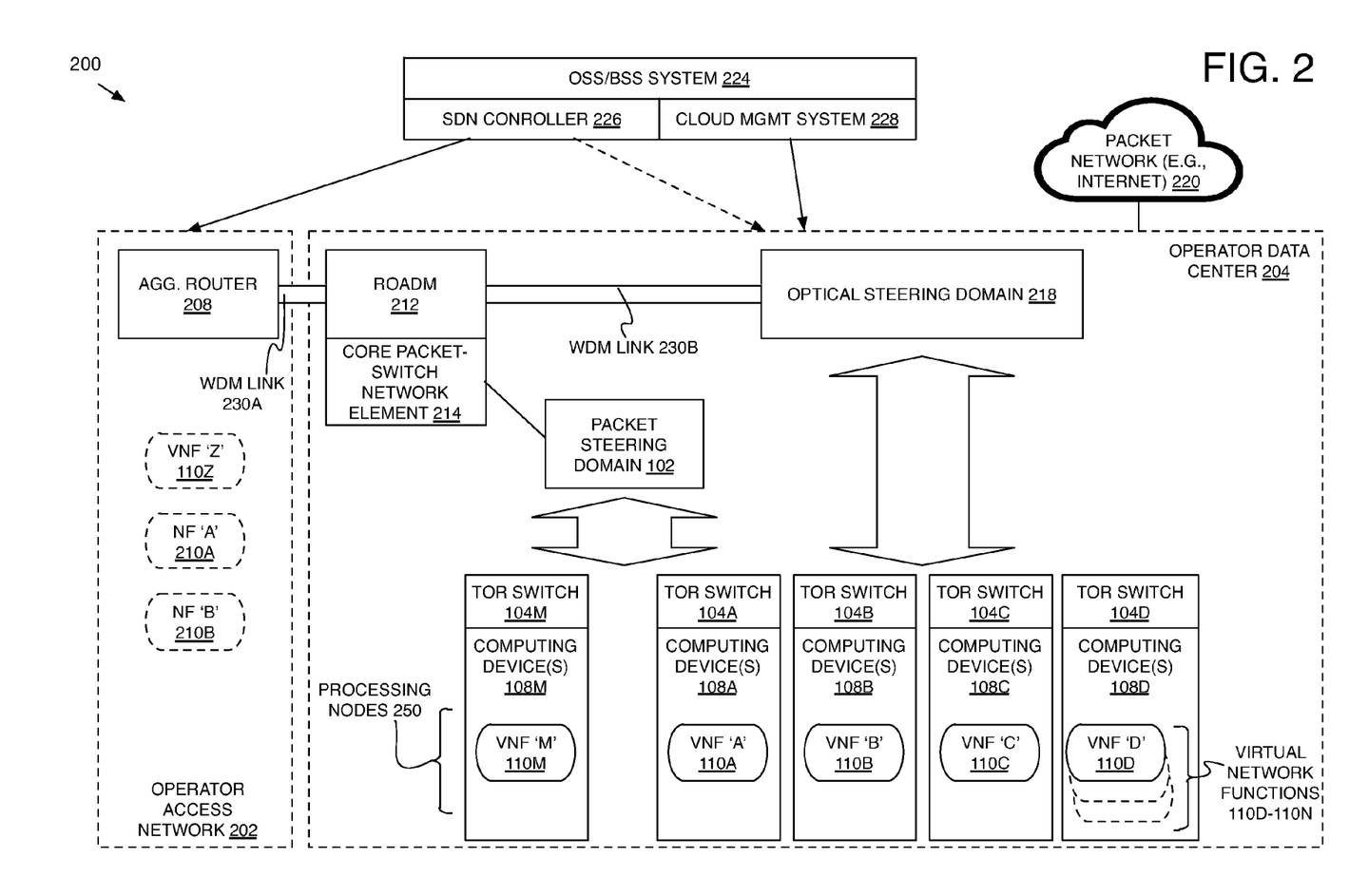
FIG. 2 illustrates a block diagram of a network architecture including an optical steering domain and a packet switching domain according to one embodiment of the invention.

FIG. 2 illustrates a block diagram of a network architecture 200 including an optical steering domain 218 and a packet switching domain 102 according to one embodiment of the invention. In this depicted embodiment, operator-defined policies for traffic steering are configured via Operations Support Systems/Business Support Systems (OSS/BSS) system 224, and are reflected as configuration rules injected by the SDN controller 226 and the cloud management system 228.

The architecture 200 introduces a novel optical steering domain 218, which operates at the dense wavelength division multiplexing (DWDM) layer to minimize power-intensive packet switching. An entire traffic path traverses both the aggregation domain (e.g., operator access network 202) and optical steering domains. Traffic destined to core vNFs (e.g., vNF 110A-110M) is first aggregated in the aggregation domain (e.g., by aggregation router 208), and grouped based on pre-defined NF policies. For example, one possible solution is using an OpenFlow-based scheme with rules specifying one or a combination of fields from packets that identify packets needing to be transmitted to a certain defined series of core NFs (e.g., vNFs 110A-110D). Thus, the processing burden of traffic aggregation lies in matching packets against fields and switching to an aggregation port. The aggregation port is equipped with optical modules to convert traffic into DWDM wavelengths. Multiple wavelengths can be multiplexed onto a single fiber (e.g., WDM link 230A) for transporting to the operator's data center 204. The aggregation domain itself, in some embodiments, can include vNFs (e.g. 110Z) and traditional NFs (e.g., 210A, 210B), though these can be placed in other locations, as well.

The entry point of the data center 204 is a reconfigurable optical add/drop module (ROADM) 212, which receives and sends traffic in the form of wavelength, and sends wavelength traffic that needs to be steered in the optical domain 218 over a WDM link 230B. After this traffic has been processed by multiple core vNF's (e.g., vNF 110A-110D), it will be steered back to the ROADM 212, and then will be routed towards its destination (e.g., by sending it through a core packet-switch network element 214 into a packet steering domain 102, sending to back to the access network 202, sending it toward another network (e.g., the Internet) 220. Note that it is possible for the traffic to exit the data center 220 in the form of a DWDM optical signal without needing to go through the core packet switch 214. Aggregated traffic carried by a wavelength is treated as a "lambda flow" in the optical steering domain 218. A lambda flow is the basic entity for steering based on its central frequency, which is a similar concept as lambda label employed in the GMPLS-based networks. Accordingly, the terms "flow" or "traffic flow" may be used, depending upon the context herein, to mean "lambda flow." For the traffic that does not need to be steered in the optical domain 218, it will be dropped by the ROADM 212 to the attached core switch(es) 214, and will be processed using traditional packet switching schemes.

Figure 3:
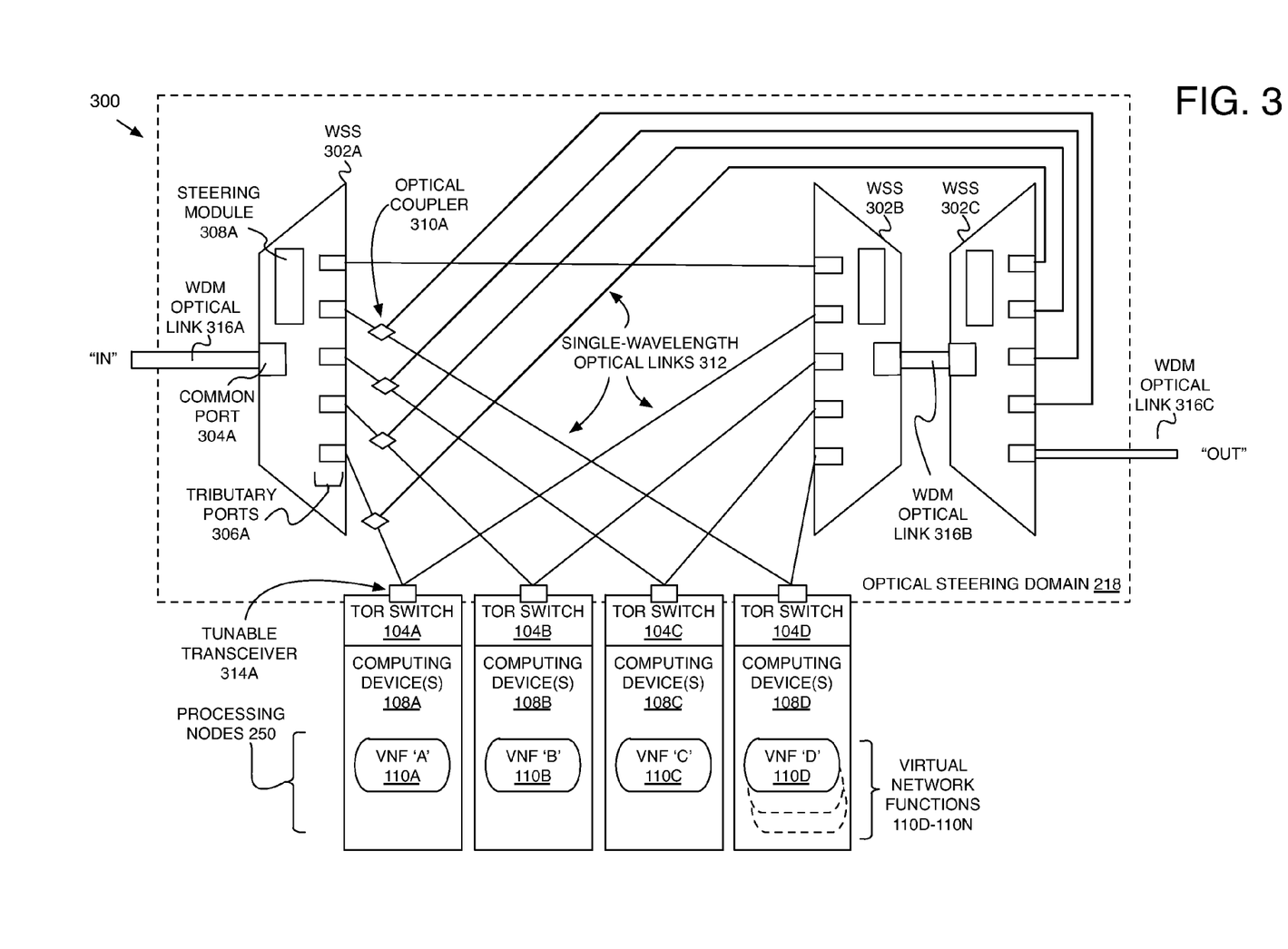
FIG. 3 illustrates the optical steering domain of FIG. 2 according to one embodiment of the invention.

FIG. 3 illustrates the optical steering domain 218 of FIG. 2 according to one embodiment of the invention. While presenting the embodiment of FIG. 3, NFV is used as a main use case. However, embodiments of the invention are used in other settings and configurations.

The optical steering domain 218 includes three wavelength selective switches (WSS) and four vNF servers 110A-110D. Each WSS 302 is an active optical switching device, which has a single common port (e.g., 304A) on one side and multiple tributary ports (e.g., 306A) on the other side. Each wavelength of light entering through the common port 304 can be flexibly directed to one of the multiple tributary ports 306, independent of how all other wavelength channels are being switched. The configuration of a WSS 302 can be changed dynamically by sending a control signal (e.g., by the SDN controller 226 and/or cloud management system 228) to its interface, which will be received and processed by its steering module 308, which will change the inner switching configuration (i.e., the connectivity between the common port 304 and tributary ports 306). For a simple representation of switching status, the notation of: $P_z^{WSSy}$:$w_x$ is used to indicate that port z of WSS y is configured at wavelength x.

The numbers of WSS 302 and vNF servers 110 in the network 300 of each embodiment depend on the actual demand. Each vNF server 110 is connected to one tributary port of $WSS_A$ 302A and $WSS_B$ 302B. Tunable transceivers 314 are equipped at each ToR switch 104A-104D to convert between DWDM (e.g., referencing at 193.10 THz with 50 GHz or 100 GHz channel spacing) and electrical signals. $WSS_B$ 302B multiplexes multiple wavelengths on the WDM optical link 316B between $WSS_B$ 302B and $WSS_C$ 302C. One tributary port of $WSS_C$ 302C ($P_5$ in this example, which is the bottom tributary port) is designated as an "exit port" to steer traffic out of the optical domain 218. The rest of the tributary ports 306 (i.e., those tributary ports that are not the exit port), based on their configuration, loop the traffic back toward the corresponding vNF servers 110 through optical links 312 and optical couplers 310. In an embodiment, each optical coupler 310 is a 2×1 passive device, allowing an optical signal to enter the device from either of the two input ports (i.e., from either $WSS_A$ 302A or $WSS_C$ 302C). In some embodiments, the two input ports of an optical coupler 310 cannot simultaneously carry incoming signals, even at different frequencies, and thus this issue is resolved by the centralized controller (e.g., SDN controller 226 and/or cloud management system 228), which configures each WSS 302 such that $WSS_C$ 302C does not cause any wavelength contention when it loops traffic back toward the vNF servers 110.

The optical/electronic/optical (O/E/O) conversion by the tunable transceivers 314 offers a free wavelength conversion to address wavelength contention. For example, if another lambda flow at the same wavelength also enters $WSS_C$ 302C, the tunable transceivers 314 may tune traffic to a different wavelength to avoid receiving conflicting lambda flows. In addition, when high spectrum efficiency is pursued by introducing a flexible grid, a single lambda flow can take multiple consecutive fine spectrum slots. This will create substantial spectrum fragments as flows dynamically arrive and depart, and lead to low spectrum utilization. With the help of O/E/O conversion, spectrum fragmentation is effectively addressed. Also, the O/E/O conversion clears the transmission impairment and extends the total length of a lambda flow.

Accordingly, as traffic of one or more lambda flows enters the optical steering domain 218 on WDM optical link 316A, $WSS_A$ 302A receives the traffic at common port 304A, and per the configuration of the steering module 308A (e.g., by the SDN controller 226 and/or cloud management system 228) causes each of the flows to be directed to and then sent by one of the tributary ports 306A. In some scenarios, each of the flows arrives on the WDM optical link 316A at a first wavelength, and per the configuration of the steering module 308A, that traffic of the flow may be transmitted by one of the tributary ports 306A at the same wavelength or a different wavelength, which can help avoid wavelength contention in the optical steering domain 218.

The single-wavelength optical links 312 are coupled to the tributary ports 306A of $WSS_A$ 302A are connected to tunable transceivers 314, which in an embodiment are connected to (or part of) ToR switches 104A-104D, and thus the traffic is sent to the vNFs 110A-110D (or vNFs 110A-110N) executing on one or more computing devices 108. When the vNFs 110A-110D are finishing processing the traffic, it is sent back toward the tunable transceivers 314. These tunable transceivers 314, in an embodiment, are configured/programmed (e.g., by the SDN controller 226 and/or cloud management system 228) to possibly change their wavelength (i.e., compared to what wavelength the traffic arrived on), and transmit the traffic back to the $WSS_B$ 302B, which multiplexes all such arriving traffic at its tributary ports 306B and transmits it out the common port 304B. The steering module 308B of the $WSS_B$ 302B may also be configured to change the wavelength of the transmitted traffic of a flow as compared to the same traffic of the flow that the $WSS_B$ 302B receives.

This traffic flows over the WDM optical link 316B to the common port 304C of $WSS_C$ 302C, and the steering module 308C of the $WSS_C$ 302C may be configured to cause the $WSS_C$ 302C to direct the traffic of the flows out an "exit port" (e.g., the bottom tributary port 306C of $WSS_C$ 302C) or out one of the other tributary ports 306C, which is looped back toward the vNFs 110A-110N and coupled, via optical couplers 310, to the plurality of optical links 312 connecting the $WSS_A$ 302A and the tunable transceivers 314. Thus, this traffic again travels to the vNFs 110A-110N for further processing, and returns to $WSS_B$ 302B and $WSS_C$ 302C, which per configuration, may direct the traffic to be looped back again toward a particular vNF (e.g., 110A) or out the exit tributary port and out of the optical steering domain 218. Thus, per the configuration of the WSSs 302 and the tunable transceivers 314, the traffic of the flows can be flexibly and efficiently steered through defined sequences of vNFs 110A-110N (possibly of differing lengths) and eventually back out of the optical steering domain 218 on WDM optical link 316C.

Figure 4:
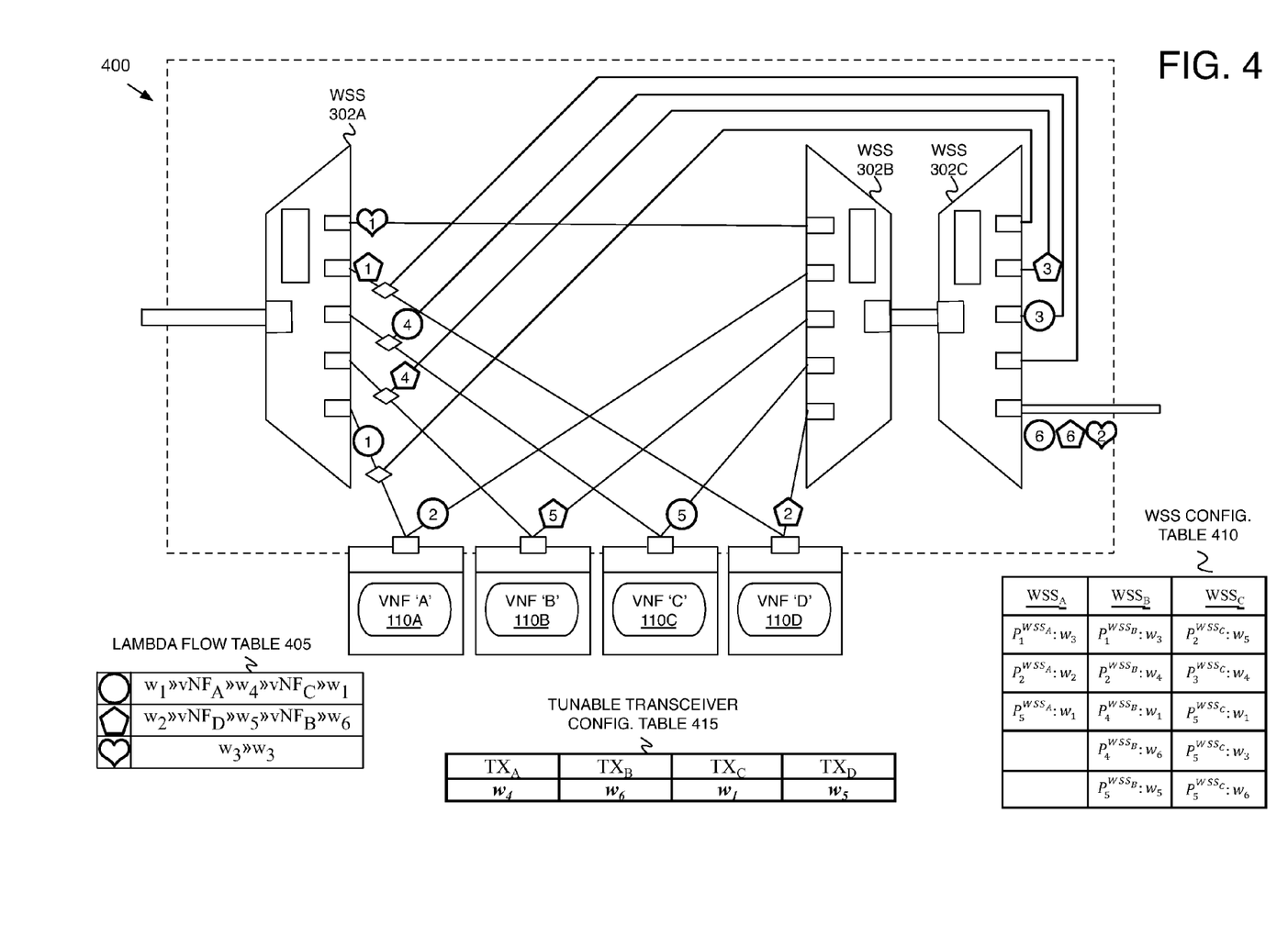
FIG. 4 illustrates that path of three exemplary traffic flows being steered through the optical steering domain of FIG. 3 according to one embodiment of the invention.

FIG. 4 illustrates that path of three exemplary traffic flows being steered through the optical steering domain 218 of FIG. 3 according to one embodiment of the invention. FIG. 4 includes the same elements as FIG. 3; however, many reference numerals have been removed in FIG. 4 for the sake of clarity. Embodiments of the invention are able to steer multiple lambda flows, in parallel, under careful resource planning by the orchestration layer. FIG. 4 provides an example to describe how the architecture of an embodiment works for NFV in data centers. In this depiction there are three lambda flows as defined by the lambda flow table 405: lambda flow 1 (represented by a circle shape) at wavelength $w_1$ is processed by $vNF_A$ 110A and then $vNF_C$ 110C; lambda flow 2 (represented by a pentagon shape) at wavelength $w_2$ is processed by $vNF_D$ 110D and then $vNF_B$ 110B; and lambda flow 3 (represented by a heart shape) at wavelength $w_3$ does not require any NF processing, so it will simply immediately exit the optical steering domain 218. Three more wavelengths $w_4$, $w_5$, and $w_6$ are available to be used for intermediate assignment.

Many possible configurations exist allowing the traffic of the three lambda flows to transit the optical steering domain 218. One such example configuration is presented herein, with respect to the tunable transceiver configuration table 415 and the WSS configuration table 410. In an embodiment, the WSSs 302 and tunable transceivers 314 are configured to receive configurations (e.g., messages, user input, etc.) and process the configurations to configure themselves to operate accordingly.

In this depicted embodiment, this configuration is made without any wavelength and NF contention amongst the lambda flows. In this configuration, lambda flow 1 keeps the exiting wavelength the same as the incoming wavelength (i.e., it is received at wavelength 1 by the first $WSS_A$ 302A and then later exits the optical steering domain 218 also at wavelength 1), which makes the optical steering domain completely transparent.

In this example, traffic of the first flow (circle shape) is received by the first $WSS_A$ 302A at wavelength 1. Since this traffic needs to be first processed by vNF 'A' 110A, the $WSS_A$ 302A is configured to transmit this traffic (at circle '1') out its fifth tributary port using wavelength 1, per the WSS configuration table 410. After it is processed by vNF 'A' 110A, the tunable transceiver (at circle '2') transmits the traffic at wavelength 4, per the tunable transceiver configuration table 415. The second $WSS_B$ 302B receives this traffic at its second tributary port at wavelength 4 and also transmits it out its common port also at wavelength 4. The $WSS_C$ 302C receives this traffic at its common port, and per its configuration, is configured to transmit it (at circle '3') out its third port at wavelength 4. This traffic is then looped back and is passed (at circle '4') onto an optical link directed back to vNF 'C' 110C. After processing by vNF 'C' 110C, the traffic is directed back to its tunable transceiver and (at circle '5') is sent back at wavelength 1 to WSS$_B$ 302B, which passes it to WSS$_C$ 302C also at wavelength 1. At this point, per its configuration, WSS$_C$ 302C transmits this traffic at wavelength 1 out its fifth port, which is the exit port out of the optical steering domain.

Similarly, traffic of the second flow (pentagon shape) is received at the WSS$_A$ 302A at wavelength 2. Per its configuration, this traffic is sent out of its second tributary port at wavelength 2 (at pentagon '1'), and is directed to vNF 'D' 110D. After vNF 'D' 110D processes the traffic, its tunable transceiver (at pentagon '2') transmits the traffic at wavelength 5 to WSS$_B$ 302B, which passes this traffic on to WSS$_C$ 302C at the same wavelength 5. WSS$_C$ 302C, per configuration, thus transmits the traffic out its second port (at pentagon '3') at wavelength 5. This traffic is then looped back and is passed (at pentagon '4') onto an optical link directed back to vNF 'B' 110B. After processing by vNF 'B' 110B, this traffic is directed back to its tunable transceiver and (at pentagon '5') is sent back at wavelength 6 to WSS$_B$ 302B, which passes the traffic on to WSS$_C$ 302C, also at wavelength 6. WSS$_C$ 302C, per configuration indicating that it is to pass any traffic at wavelength 6 out the exit port, transmits the traffic out of its fifth, exit tributary port and out of the optical steering domain.

As indicated above, traffic of the third flow is configured to immediately exit the optical steering domain. Thus, traffic of the third flow (heart shape) is received at wavelength 3 by WSS$_A$ 302A, and sent out of the first tributary port, which leads directly to WSS$_B$ 302B, thereby skipping the vNFs 110. WSS$_B$ 302B passes this traffic, still at wavelength 3, to WSS$_C$ 302C, which per configuration transmits all traffic of wavelength 3 out of the last (i.e., fifth) tributary exit port out of the optical steering domain.

As indicated above, many other configurations are possible for this scenario which use different wavelengths of light to transmit the flows. Accordingly, the orchestration layer may use any of a multitude of algorithms to determine which flows are to be transmitted at what particular wavelengths at the particular stages, including greedy search algorithms and even naïve algorithms to iteratively begin to exhaustively enumerate all configuration possibilities until a proper, non-conflicting solution is arrived upon. At that point, the orchestration layer may utilize techniques to configure the WSSs 302, optical couplers 310, and tunable transceivers 314 accordingly.

Figure 5:
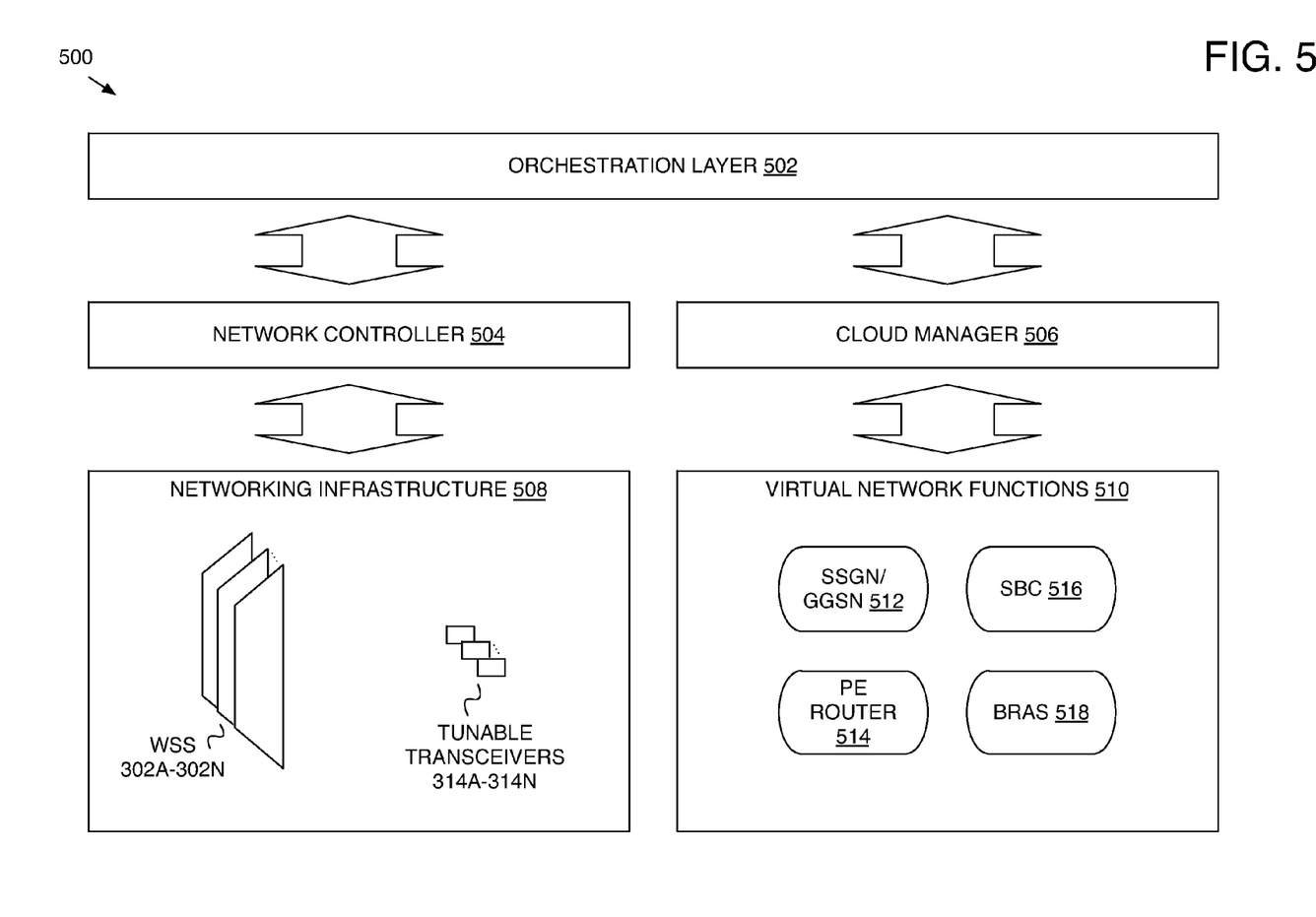
FIG. 5 illustrates the functional architecture of portions of the network architecture of FIG. 3 according to one embodiment of the invention.

FIG. 5 illustrates the functional architecture of portions of the network architecture of FIG. 3 according to one embodiment of the invention. This depicted embodiment provides a natural support to evolution towards SDN. The centralized network controller 504 connects to all the configurable network elements (i.e., networking infrastructure 508) such as WSSs 302A-302N and tunable transceivers 314A-314N. On the other hand, the cloud manager 506 is responsible for vNF 110 instantiation. In this depicted embodiment, there are four vNFs including a SSGN/GGSN 512, SBC 516, PE router 514, and BRAS 518, although many other vNF types exist (e.g., home gateway, enterprise access router, carrier grade network address translation (NAT), firewall, test head, etc.) and more, fewer, and/or different vNF types may be utilized. The northbound interfaces of both the network controller 504 and the cloud manager 506 provide an application programming interface (API) to an orchestration layer 502. When a policy is specified by an operator (e.g., network operator), the configurations will be computed by the orchestration layer 502 based on networking status and server availability, and sent through these APIs to the network controller 504 and cloud manager 506, which in turn configure the networking infrastructure 508 and vNFs 510, respectively. The orchestration layer 502 has the global information of both networking and server status, and is responsible for optimizing wavelength assignment (as described above) and NF instantiation.

The southbound interface between the network controller 504 and the configurable network elements (i.e., networking infrastructure 508) offers a unified control channel to push down configurations to set up optical paths. This interface requires support of optical circuit switching, and can be realized by using proprietary command provided by hardware vendors, and/or by standardized protocols such as the OpenFlow protocol. The latest version of the OpenFlow protocol (v1.4) introduces the extension to optical circuit configuration and to enable this architecture.

Figure 6:
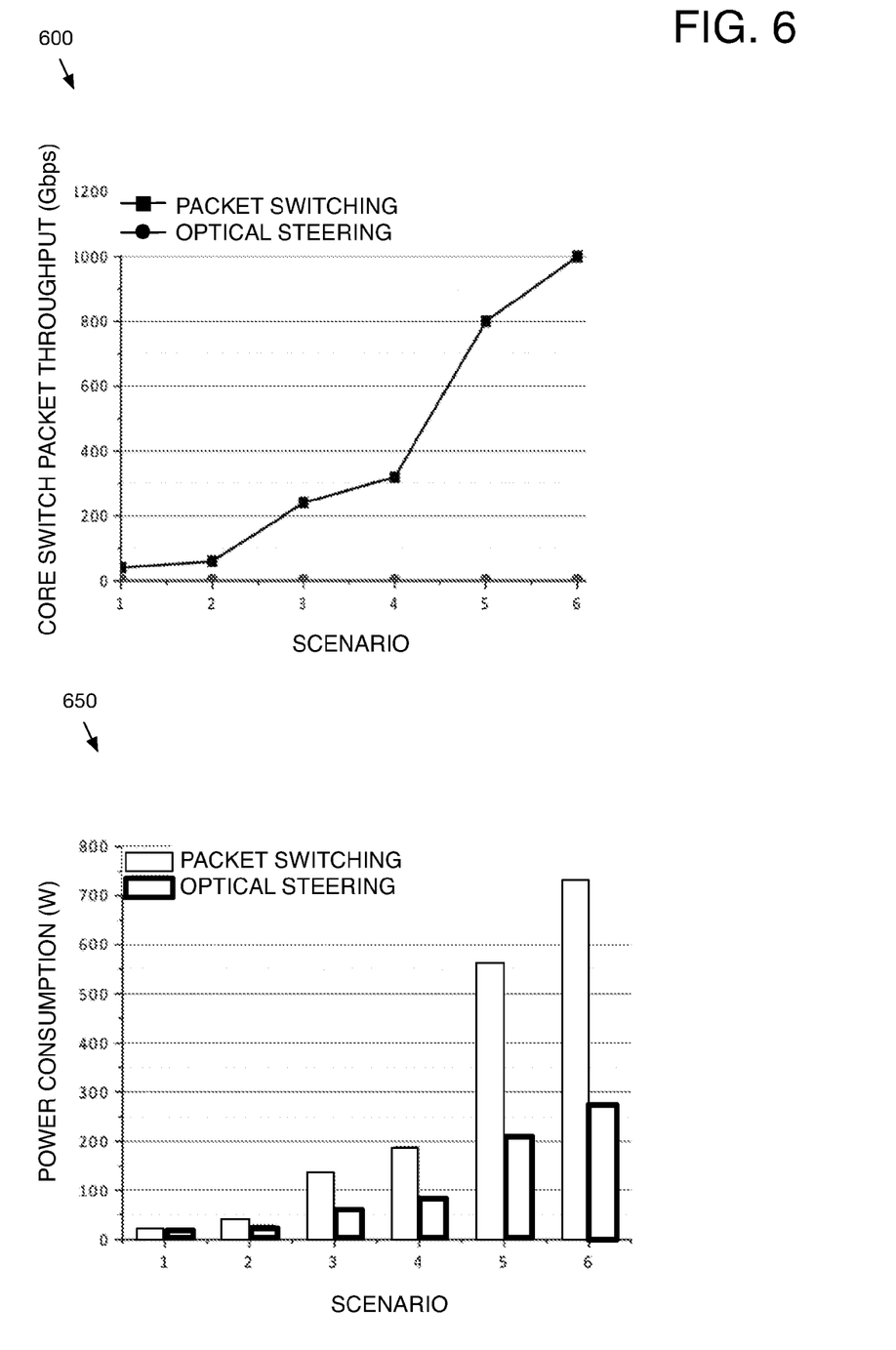
FIG. 6 illustrates two line graphs presenting benefits provided by the use of the optical steering domain according to embodiments of the invention.

FIG. 6 illustrates two line graphs (600, 650) presenting benefits provided by the use of the optical steering domain according to embodiments of the invention. Embodiments of the optical steering domain architecture disclosed herein leverage benefits provided by DWDM technology and optical switching, and have many advantages as compared to traditional packet-switching solutions.

One benefit is flexibility. Embodiments of the invention support flexible configuration for optical paths across vNFs 110. The WSS 302, as the basic wavelength switching element, offers a low tuning time of around 100 ms. Compared with the time needed to instantiate a core network function, which is typically at the order of a few minutes, the time for optical path configuration can be within hundreds of milliseconds, which meets the requirement of dynamicity to steer traffic across vNFs 110. The flexibility of traffic steering is further enhanced by the ability to offer multiple choices of computing devices (possibly at different racks) for vNF instantiation, which can avoid potential wavelength contention. For example, when no wavelength is available to a particular server device (i.e., computing device) running the required network function instance, a different server device with wavelength available to it can be chosen to instantiate the same required network function. Additionally, for extremely high volume of traffic carried by multiple lambda flows, network functions can be instantiated at multiple server devices. By distributing these lambda flows to different servers, embodiments of the invention offer extra flexibility for load balancing.

Another benefit is scalability. The optical steering domain makes the steering architecture less sensitive to traffic and vNF demand growth. The WSSs 302 wavelength is in optical domain, and thus is agnostic of the traffic rate carried by each wavelength it switches. Therefore, the same WSS can be used when a lambda flow grows to a higher rate. In contrast, increasing traffic volume requires higher switching throughput of a non-optical (e.g., electrical) packet switch. Since switching in optical domain is much more energy efficient than in the electrical packet domain, in the electrical domain it is desirable to keep packet throughput as low as possible. For a flow at rate r traversing n vNFs, the required packet throughput in the core switches can be calculated as: $T_P = r \times (1+n)$.

However, using embodiments of the invention, there is no need to perform packet switching in core switches. For example, graph 600 illustrates six scenarios with growing traffic volume and vNF demand. The six scenarios are as presented below in Table A:

TABLE A

Scenarios for scalability analysis (2 flows).

| Scenario | Flow rate (Gbps) | Number of vNFs used per flow |
|---|---|---|
| 1 | 10 | 1 |
| 2 | 10 | 2 |
| 3 | 40 | 2 |
| 4 | 40 | 3 |
| 5 | 100 | 3 |
| 6 | 100 | 4 |

Graph 600 illustrates the corresponding throughput of core switches for both a packet-based scheme (line with square data points) and an embodiment of the invention using an optical steering domain (line with circle data points). It is evident that, as the traffic volume and the number of required vNFS per flow increases, the flow needs to be switched more times by the switch at higher rates. In contrast, packet switching at core switches is avoided for lambda flows, which therefore requires zero packet throughput at core switches. However, when ToR switches are used, under either traditional packet switching or in embodiments of the invention using optical steering domain architectures, these ToR switches may remain operating as packet based, and therefore packet switching will still be utilized. Thus, the packet throughput is the same for the two architectures, and therefore is not illustrated.

Another benefit provided by embodiments of the invention is power efficiency, which is illustrated in graph 650. In this graph 650, the power consumption is measured at a system level, which means it includes all components. For example, the power consumption by 10 GbE traffic typically includes transceivers, line cards, network fabric cards, chassis, etc. For the transceiver, the packet solution is assumed to employ grey transceivers (e.g., 10 G SFP+), while optical steering domain architecture employs DWDM 10 G tunable transceivers.

Graph 650 illustrates the power consumption of the packet-based and optical steering domain architecture for the same six scenarios presented above in Table A. It can be observed that the gap between the two architectures becomes larger as traffic grows, due to the increasing difference of packet throughput needed by the two architectures.

Figure 7:
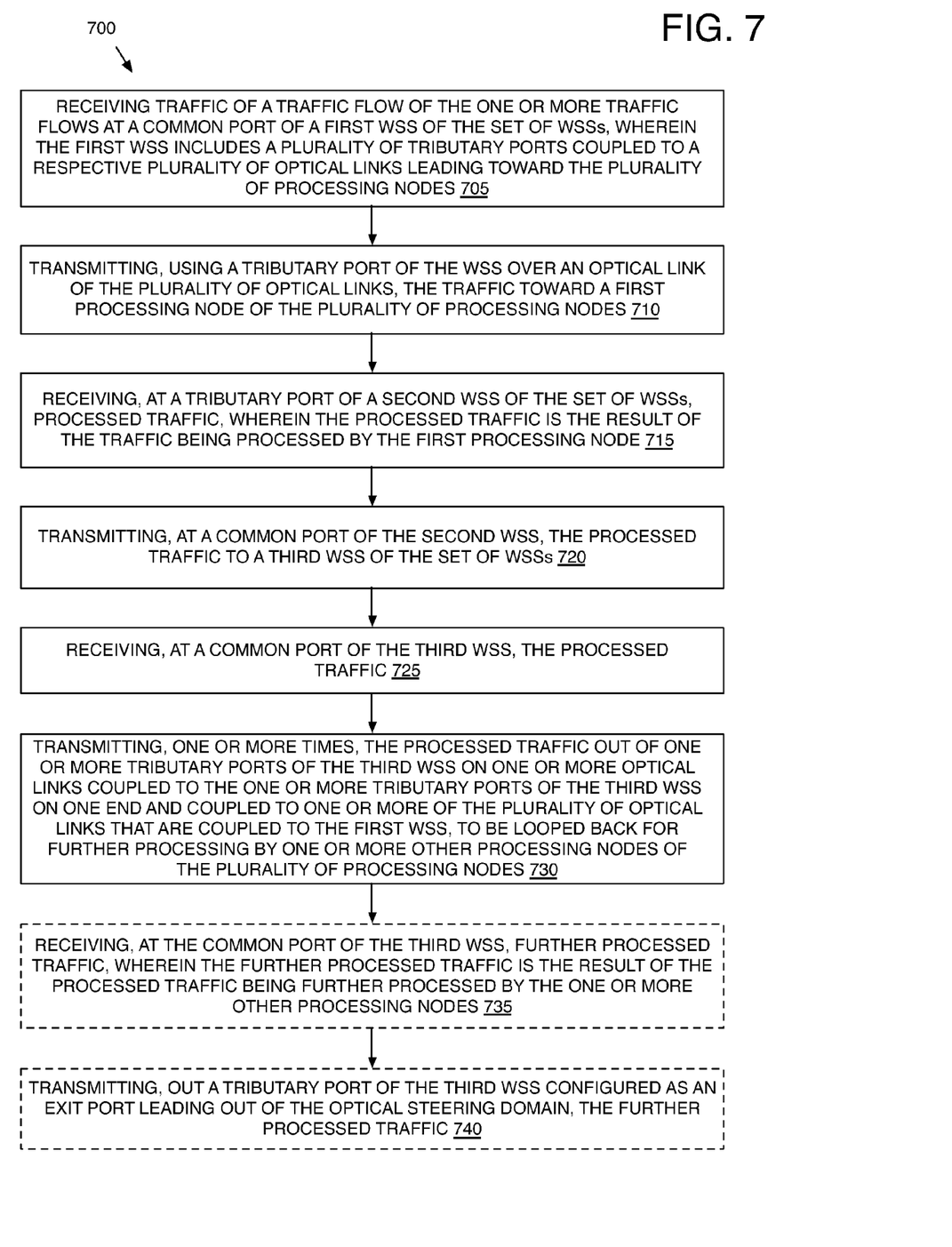
FIG. 7 illustrates a flow in an optical steering domain for steering one or more traffic flows through a plurality of processing nodes according to one embodiment of the invention.

FIG. 7 illustrates a flow 700 in an optical steering domain for steering one or more traffic flows through a plurality of processing nodes according to one embodiment of the invention. The operations of this flow diagram will be described with reference to the exemplary embodiments of the other diagrams. However, it should be understood that the operations of this flow diagram can be performed by embodiments of the invention other than those discussed with reference to these other diagrams, and the embodiments of the invention discussed with reference to these other diagrams can perform operations different than those discussed with reference to this flow diagram.

According to an embodiment, each of the one or more flows of traffic is to be processed by a different defined series (or, "chain") of one or more processing nodes of the plurality of processing nodes. In an embodiment, each processing node is a vNF. The optical steering domain includes a set of three or more wavelength selective switches (WSSs).

The flow 700 includes, at block 705, receiving traffic of a traffic flow of the one or more traffic flows at a common port of a first WSS of the set of WSSs. The first WSS includes a plurality of tributary ports coupled to a respective plurality of optical links leading toward the plurality of processing nodes. The traffic, in an embodiment, is received from a ROADM and each of the traffic flows is received at a different wavelength. In an embodiment, the first WSS also includes one or more other tributary ports that lead directly to a second WSS.

The flow 700 also includes, at block 710, transmitting, using a tributary port of the WSS over an optical link of the plurality of optical links, the traffic toward a first processing node of the plurality of processing nodes. In an embodiment, the traffic is received by a tunable transceiver coupled to a switch, and then sent to a computing device executing a processing node that is to first process the traffic. In an embodiment, after processing the traffic, the processing node sends the traffic back to the switch, and then flows to the tunable transceiver. In some embodiments, the tunable transceiver is configured to change the wavelength of the traffic that it now sends.

At block 715, the flow 700 includes receiving, at a tributary port of a second WSS of the set of WSSs, processed traffic. The processed traffic is the result of the traffic being processed by the first processing node. The traffic may be at the same wavelength as it was when sent by the first WSS, or at a different wavelength. At block 720, the flow 700 includes transmitting, at a common port of the second WSS, the processed traffic to a third WSS of the set of WSSs, and then at block 725 the flow 700 includes receiving, at a common port of the third WSS, the processed traffic.

At block 730, the flow includes transmitting, one or more times, the processed traffic out of one or more tributary ports of the third WSS on one or more optical links. The one or more optical links are coupled to the one or more tributary ports of the third WSS on one end and coupled to one or more of the plurality of optical links that themselves are coupled to the first WSS. The processed traffic is thus looped back for further processing by one or more other processing nodes of the plurality of processing nodes.

In some embodiments, the flow 700 includes at block 735 receiving, at the common port of the third WSS, further processed traffic. The further processed traffic is the result of the processed traffic being further processed by the one or more other processing nodes.

In some embodiments, the flow 700 includes at block 740 transmitting, out another tributary port of the third WSS, the further processed traffic. This tributary port of the third WSS is an exit port leading out of the optical steering domain.

Aspects of embodiments of the invention hereby focused upon steering large traffic flows in data centers where core network functions are virtualized. Embodiments of the invention introduce an optical steering domain to such data centers to perform traffic steering at the wavelength level. Wavelength division multiplexing (WDM) technology and reconfigurable wavelength switching devices are employed to flexibly set up optical paths based on network function demand and resource availability. The optical steering domain architecture complements traditional packet-based schemes (which handle fine-grained traffic) by handling coarse-grained traffic, and additionally offers high scalability and flexibility. Further, embodiments of the invention significantly save power, especially in long runs.

While embodiments of the invention has been described in relation to NFV and data centers, other embodiments are useful in other systems where a large volume of traffic needs to be steered in a coarse manner. Therefore, embodiments of the invention are not so limited to use with NFV.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an optical steering domain for steering one or more traffic flows through a plurality of processing nodes, wherein each of the one or more flows of traffic is to be processed by a different defined series of one or more processing nodes of the plurality of processing nodes, and wherein the optical steering domain comprises a set of three or more wavelength selective switches (WSSs), the method comprising:
   receiving traffic of a traffic flow of the one or more traffic flows at a common port of a first WSS of the set of WSSs, wherein the first WSS includes a plurality of tributary ports coupled to a respective plurality of optical links leading toward the plurality of processing nodes;
   transmitting, using a first tributary port of the WSS over a first optical link of the plurality of optical links, the traffic toward a first processing node of the plurality of processing nodes;
   receiving, at a tributary port of a second WSS of the set of WSSs, processed traffic, wherein the processed traffic is the result of the traffic being processed by the first processing node;
   transmitting, at a common port of the second WSS, the processed traffic to a third WSS of the set of WSSs;
   receiving, at a common port of the third WSS, the processed traffic; and
   transmitting, one or more times, the processed traffic out of one or more tributary ports of the third WSS on one or more optical links coupled to the one or more tributary ports of the third WSS on one end and coupled to one or more of the plurality of optical links that are coupled to the first WSS, to be looped back for further processing by one or more other processing nodes of the plurality of processing nodes.

2. The method of claim 1, further comprising:
   receiving, at the common port of the third WSS, further processed traffic, wherein the further processed traffic is the result of the processed traffic being further processed by the one or more other processing nodes; and
   transmitting, out another tributary port of the third WSS, the further processed traffic, wherein the another tributary port of the third WSS is an exit port leading out of the optical steering domain.

3. The method of claim 2, wherein:
   the first WSS receives the traffic from a reconfigurable optical add/drop module (ROADM); and
   the another tributary port of the third WSS that is the exit port leading out of the optical steering domain leads to the ROADM.

4. The method of claim 1, wherein each of the one or more traffic flows is received at the first WSS on a different wavelength.

5. The method of claim 1, wherein the one or more optical links are coupled to the plurality of links using an optical coupler device.

6. The method of claim 1, wherein the plurality of optical links coupled to the plurality of tributary ports of the first WSS that lead toward the plurality of processing nodes are further coupled to a respective plurality of tunable transceivers.

7. The method of claim 6, wherein the plurality of tunable transceivers are coupled to a plurality of switch network devices, wherein the plurality of switch network devices are Top-of-Rack (ToR) switches coupled to respective sets of one or more computing devices implementing the plurality of processing nodes.

8. The method of claim 1, wherein each of the plurality of processing nodes is a virtualized network function (vNF) executing on a computing device.

9. A system to implement an optical steering domain to steer one or more traffic flows through a plurality of processing nodes, the system comprising:
   a first wavelength selective switch (WSS) comprising,
      a first common port configured to receive the one or more traffic flows from outside the optical steering domain,
      a first plurality of tributary ports to be coupled to a respective first plurality of optical links leading toward the plurality of processing nodes, and
      a first steering module coupled to the first common port and the first plurality of tributary ports, wherein the first steering module is configured to,
         receive a configuration indicating, for each of the one or more traffic flows, a wavelength that the traffic flow is to be sent at and one of the first plurality of tributary ports that is to be used to send the traffic flow toward the processing node that the traffic flow is to be initially processed by, and
         cause each of the one or more traffic flows to be sent at the respective wavelength using the respective one of the first plurality of tributary ports;
   a second WSS comprising,
      a second plurality of tributary ports configured to receive processed traffic for each of the one or more traffic flows, wherein the processed traffic is the traffic of the one or more flows that has been processed by one or more of the plurality of processing nodes, and
      a second common port coupled to a third WSS and configured to transmit the received processed traffic to the third WSS; and
   the third WSS coupled to the second WSS and comprising,
      a third common port configured to receive the processed traffic from the second WSS,
      a third plurality of tributary ports coupled to a second plurality of optical links that are coupled to the first plurality of optical links, and
      a second steering module coupled to the third common port and to the third plurality of tributary ports and configured to,
         cause that of the processed traffic that requires further processing to be transmitted by the third plurality of tributary ports to be looped back toward the plurality of processing nodes, and
         cause that of the processed traffic that does not require further processing to be transmitted by a different tributary port of the third WSS that is an exit port leading out of the optical steering domain.

10. The system of claim 9, further comprising:
a reconfigurable optical add/drop module (ROADM) to be coupled to the first common port of the first WSS, wherein the ROADM is configured to,
receive a bulk of traffic, and
transmit that of the bulk of traffic that requires processing by the plurality of processing nodes as the one or more traffic flows to the first WSS.

11. The system of claim 10, wherein the ROADM is further configured to transmit that of the bulk of traffic that does not require processing by the plurality of processing nodes to a switch network device.

12. The system of claim 11, wherein the switch network device comprises a non-optical core packet switch.

13. The system of claim 10, wherein each of the first WSS, the second WSS, the third WSS, and the ROADM are further configured to:
receive, from a controller network element, control messages indicating how each respective recipient is to steer the traffic to enable the processing by the plurality of processing nodes; and
configure, according to the control messages, the inner switching configuration of the respective recipient.

14. The system of claim 9, wherein the first plurality of optical links are further to be coupled to a plurality of switch network devices.

15. The system of claim 14, wherein the plurality of switch network devices are top-of-rack (ToR) switches that are to be coupled to respective sets of one or more computing devices.

16. The system of claim 9, wherein one or more of the plurality of processing nodes are virtualized network functions (vNF) executing on one or more computing devices.

17. The system of claim 9, wherein the second plurality of optical links are to be coupled to the first plurality of optical links using optical coupler devices.

18. A method in an optical steering domain for steering traffic through a plurality of processing nodes, the method comprising:
receiving a first set of one or more packets at a first optical port of a first wavelength selective switch (WSS), wherein the first set of packets are to be serially processed by a first processing node and a second processing node of the plurality of processing nodes;
transmitting, at a second optical port of the first WSS, the first set of packets toward the first processing node;
receiving, at a first optical port of a second WSS, a second set of packets that have been processed and sent by the first processing node;
transmitting, at a second optical port of the second WSS, the second set of packets to a third WSS;
receiving, at a first optical port of the third WSS, the second set of packets;
transmitting, at a second optical port of the third WSS, the second set of packets, wherein the second optical port is coupled to an optical link that is further coupled to another optical link that itself is coupled to the first WSS at one end and leads to the second processing node at the other end;
receiving a third set of packets at a third optical port of the second WSS, wherein the third set of packets result from the processing of the second set of packets by the second processing node;
transmitting, at the second optical port of the second WSS, the third set of packets to the third WSS;
receiving, at the third WSS, the third set of packets; and
transmitting, at a third optical port of the third WSS, the third set of packets out of the optical steering domain.

19. The method of claim 18, wherein:
the first processing node is a first virtualized network function (vNF) instance executing at a first computing device; and
the second processing node is a second vNF instance executing at a second computing device.

20. The method of claim 18, wherein:
the first set of packets transmitted at the second optical port of the first WSS are transmitted at a first wavelength; and
the second set of packets received at the first optical port of the second WSS are received at a second wavelength.

* * * * *

UNITED STATES PATENT AND TRADEMARK OFFICE
CERTIFICATE OF CORRECTION

PATENT NO. : 9,520,961 B2
APPLICATION NO. : 14/192133
DATED : December 13, 2016
INVENTOR(S) : Xia et al.

It is certified that error appears in the above-identified patent and that said Letters Patent is hereby corrected as shown below:

On the Title Page

In Item (74), under "Attorney, Agent, or Firm", in Column 2, Line 2, delete "Elliot," and insert -- Elliott, --, therefor.

In the Figure, delete Tag "310A" and insert Tag -- 310 --, therefor.

On Page 3, in Item (56), under "OTHER PUBLICATIONS", in Column 1, Line 32, delete "DiffSery" and insert -- DiffServ --, therefor.

On Page 3, in Item (56), under "OTHER PUBLICATIONS", in Column 1, Line 48, delete "221t." and insert -- 2211. --, therefor.

On Page 3, in Item (56), under "OTHER PUBLICATIONS", in Column 1, Line 53, delete "Norking" and insert -- Working --, therefor.

On Page 3, in Item (56), under "OTHER PUBLICATIONS", in Column 2, Line 17, delete "Norking" and insert -- Working --, therefor.

In the Drawings

In Fig. 3, Sheet 3 of 7, delete Tag "310A" and insert Tag -- 310 --, therefor.

In Fig. 5, Sheet 5 of 7, for Tag "512", in Line 1, delete "SSGN/" and insert -- SGSN/ --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*

In Fig. 6, Sheet 6 of 7, delete " 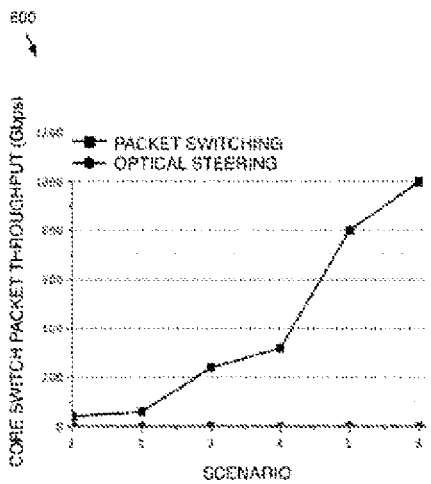 " and
insert -- 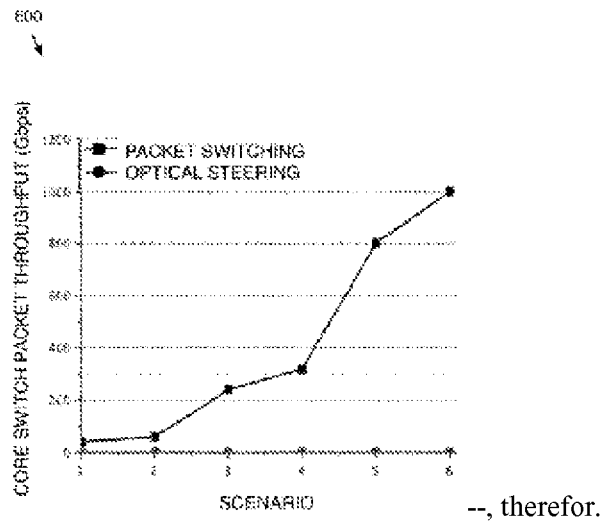 --, therefor.

In the Specification

In Column 1, Line 9, delete "Steering,"," and insert -- Steering," --, therefor.

In Column 7, Line 32, delete "networks" and insert -- network's --, therefor.

In Column 9, Line 41, delete "switching" and insert -- steering --, therefor.

In Column 10, Lines 15-16, delete "data center 220" and insert -- data center 204 --, therefor.

In Column 13, Line 55, delete "SSGN/GGSN" and insert -- SGSN/GGSN --, therefor.

In Column 15, Line 17, delete "vNFS" and insert -- vNFs --, therefor.

In Column 16, Line 27, delete "725" and insert -- 725, --, therefor.